United States Patent
Jang et al.

(10) Patent No.: US 9,938,391 B2
(45) Date of Patent: Apr. 10, 2018

(54) METHOD FOR PREPARING POLYOLEFIN RESIN COMPOSITION AND POLYOLEFIN RESIN COMPOSITION

(71) Applicant: LOTTE CHEMICAL CORPORATION, Seoul (KR)

(72) Inventors: Eun Hwa Jang, Daejeon (KR); Young-Bum Kim, Daejeon (KR); Seong-Min Cho, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 0 days.

(21) Appl. No.: 15/119,408

(22) PCT Filed: Jul. 6, 2015

(86) PCT No.: PCT/KR2015/006953
§ 371 (c)(1),
(2) Date: Aug. 17, 2016

(87) PCT Pub. No.: WO2016/006895
PCT Pub. Date: Jan. 14, 2016

(65) Prior Publication Data
US 2017/0121486 A1    May 4, 2017

(30) Foreign Application Priority Data
Jul. 7, 2014   (KR) ........................ 10-2014-0084615

(51) Int. Cl.
*C08J 9/32*    (2006.01)
*C08J 5/04*    (2006.01)
*C08L 23/12*   (2006.01)

(52) U.S. Cl.
CPC ................. *C08J 9/32* (2013.01); *C08J 5/043* (2013.01); *C08L 23/12* (2013.01); *C08J 2323/12* (2013.01); *C08J 2423/12* (2013.01); *C08L 2205/025* (2013.01)

(58) Field of Classification Search
CPC .................................... C08J 5/043; C08J 9/32
USPC ......................................................... 523/210
See application file for complete search history.

(56) References Cited

U.S. PATENT DOCUMENTS 7,790,787 B2   9/2010   Williams et al.
8,921,436 B2   12/2014  Lee et al.

FOREIGN PATENT DOCUMENTS

| JP | 06-345917 | 12/1994 |
| KR | 10-2007-0080673 | 8/2007 |
| KR | 10-2011-0076341 | 7/2011 |
| KR | 10-2011-0109302 | 10/2011 |
| KR | 10-1147386 | 5/2012 |
| KR | 10-2013-0032101 | 4/2013 |
| KR | 10-2013-0049369 | 5/2013 |
| KR | 10-2013-0057505 | 6/2013 |
| KR | 10-2013-0135519 | 12/2013 |
| WO | 99-38610 | 8/1999 |
| WO | 2006-110471 | 10/2006 |

OTHER PUBLICATIONS

KR 10-20130057505 machine translation. Original date 2013.*
Search Report & Written Opinion, Patent Cooperation Treaty, dated Oct. 13, 2015, Application No. PCT/KR2015/006953.
EPO, Extended European Search Report of EP 15819303.7 dated Dec. 21, 2017.

* cited by examiner

*Primary Examiner* — Edward J Cain
(74) *Attorney, Agent, or Firm* — Lex IP Meister, PLLC

(57) ABSTRACT

The present invention relates to a method for preparing a polyolefin resin composition including the step of mixing a first resin chip including a first polyolefin resin and glass filaments and a second resin chip including a second polyolefin resin and an aerogel or glass bubbles, a polyolefin resin composition including a first resin chip including a first polyolefin resin and glass filaments and a second resin chip including a second polyolefin resin and an aerogel or glass bubbles, and a polyolefin resin molded article including an extrusion molded article of the polyolefin resin composition.

20 Claims, 1 Drawing Sheet

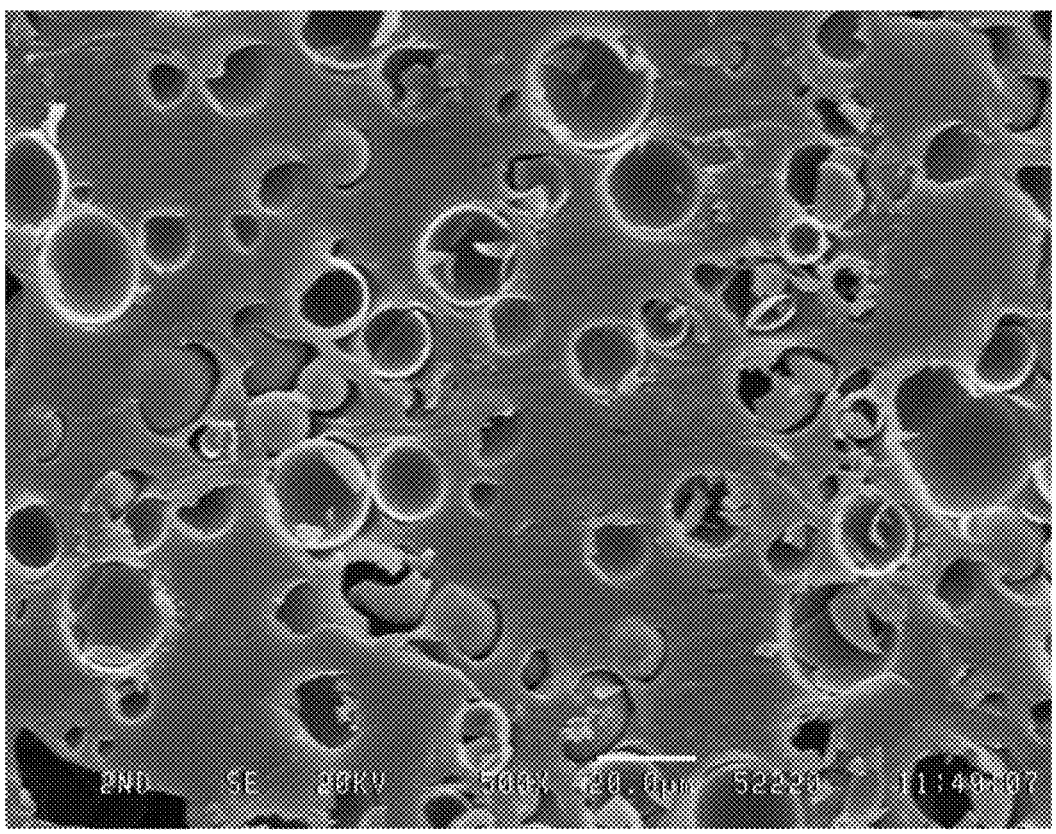

US 9,938,391 B2

METHOD FOR PREPARING POLYOLEFIN RESIN COMPOSITION AND POLYOLEFIN RESIN COMPOSITION

CROSS-REFERENCE TO RELATED APPLICATION(S)

This application claims the priority to Korean Patent Application No. 10-2014-0084615 filed on Jul. 7, 2014, the entire contents of which are incorporated herein by reference.

TECHNICAL FIELD

The present invention relates to a method for preparing a polyolefin resin composition, and a polyolefin resin composition, and more specifically to a method for preparing a polyolefin resin composition that can substantially maintain properties and characteristics of components and yet more uniformly mix them, that can provide a polyolefin resin composition having high mechanical properties and heat resistance even in a low specific gravity range and have uniform properties, and a polyolefin resin composition that can secure high mechanical properties and heat resistance even in a low specific gravity range and has uniform properties over an entire area thereof.

BACKGROUND OF THE INVENTION

In order to improve tensile strength, flexural strength, and impact strength of a polyolefin resin such as polypropylene and the like, methods of adding rigid reinforcement such as other polymer resins, rubber components, or inorganic fillers and the like are used. However, adding of general reinforcement materials could not sufficiently improve mechanical properties, and compatibilizers used to uniformly mix them with the polyolefin resin were not suitable for wide use because they are relatively expensive.

Recently, in order to apply a polypropylene resin for automobile parts and electrical/electronic parts, inorganic fillers such as glass fiber, talc, whiskers, glass bubbles, and the like have been extensively used as a rigid reinforcement.

For example, Korean Registered Patent No. 1147386 (Patent Document 1) discloses a resin composition including a polyolefin-based resin, inorganic fillers, glass bubbles, and ionomers functioning as a compatibilizer. However, in Patent Document 1, the polyolefin and glass bubbles are mixed using a twin screw [0018] extruder to prepare a polypropylene composite resin composition, however, when the polymer resin and glass bubbles are simply mixed and extruded, it may be difficult to maintain the shape of the glass bubbles and the effect of improving properties resulting from the use of glass bubbles may not be so significant.

Further, Korean Laid-Open Patent Publication No. 2013-0135519 (Patent Document 2) discloses a method of using equipment performing a continuous process of an extruder and an injection machine in order to increase impregnability and compatibility between a polyolefin resin and inorganic fillers such as glass fiber, glass bubbles, and the like. However, even by this method, the shape of the glass fiber and glass bubbles may be changed in the extrusion and injection processes, and glass bubbles located inside the polymer resin may be pulverized to form pores at those parts, thus degrading the properties of the final product.

Recently, methods of using an aerogel or air-gel are being introduced in the fields of insulating materials, shock absorbers, soundproof materials, and the like. The aerogel is characterized by a structure consisting of entangled microfilaments with a thickness of about 1 ten thousandths of that of a hair and a porosity of 90% or more, and the main material thereof is silicon oxide, carbon, or an organic polymer. Particularly, the aerogel is a very low density material having high light transmittance and very low thermal conductivity due to the above-explained structural characteristics. However, since the aerogel has very weak strength such as being easily broken by a small impact due to high brittleness and is difficult to process in various thicknesses and shapes, it had a limitation for application as an insulating material despite its excellent insulation property, and in case an aerogel and other reactants are mixed, a polymer resin may permeate inside the aerogel to increase the viscosity of the compound, making mixing impossible, and thus complexation or use in combination with other materials is difficult, and it cannot exhibit the properties of a porous aerogel.

Particularly, the aerogel had problems in that it does not have high compatibility with a polymer resin or the shape is changed or destroyed in the process of mixing with a polymer resin, and thus various methods of mixing a polymer resin and an aerogel have been attempted.

PRIOR ART DOCUMENTS

Patent Documents (Patent Document 1) Korean Registered Patent No. 1147386
(Patent Document 2) Korean Laid-Open Patent Publication No. 2013-0135519

DISCLOSURE OF INVENTION

Technical Problem

It is an object of the invention to provide a method for preparing a polyolefin resin composition that can substantially maintain the properties and the characteristics of the components and yet more uniformly mix them, and can provide a polyolefin resin composition having high mechanical properties and heat resistance even in a low specific gravity range and having uniform properties.

It is another object of the invention to provide a polyolefin resin composition that can secure high mechanical properties and heat resistance even in a low specific gravity range and has uniform properties over an entire area thereof.

It is yet another object of the invention to provide a polyolefin resin molded article that can secure high mechanical properties and heat resistance even in a low specific gravity range and has uniform properties over an entire area thereof.

Technical Solution to Problem

Provided herein is a method for preparing a polyolefin resin composition including the step of mixing a first resin chip including a first polyolefin resin and glass filaments impregnated in the first polyolefin resin, and a second resin chip including a second polyolefin resin and an aerogel or glass bubbles impregnated in the second polyolefin resin, wherein a ratio of a length of the second resin chip to a length of the first resin chip is 0.8 to 1.2.

Also provided herein is a polyolefin resin composition including a mixture of a first resin chip including a first polyolefin resin and glass filaments impregnated in the first polyolefin resin, and a second resin chip including a second polyolefin resin and an aerogel or glass bubbles impregnated in the second polyolefin resin, wherein micropores having a diameter of 1 to 50 μm are distributed in the second resin chip, and the polyolefin resin composition has a specific gravity of 0.75 to 1.00.

Also provided herein is a polyolefin resin molded article including an extrusion molded article of the polyolefin resin composition, and having a specific gravity of 0.75 to 1.05.

Hereinafter, a method for preparing a polyolefin resin composition and a polyolefin resin composition according to specific embodiments will be explained in detail.

According to one embodiment of the invention, provided is a method for preparing a polyolefin resin composition including the step of mixing a first resin chip including a first polyolefin resin and glass filaments impregnated in the first polyolefin resin, and a second resin chip including a second polyolefin resin and an aerogel or glass bubbles impregnated in the second polyolefin resin, wherein a ratio of a length of the second resin chip to a length of the first resin chip is 0.8 to 1.2.

The inventors conducted studies on a method for more easily and uniformly mixing a polyolefin resin, glass filaments, and an aerogel or glass bubbles, confirmed through experiments that if glass filaments and an aerogel or glass bubbles are respectively impregnated in a polyolefin resin, for example, prepared into a polymer resin chip, and mixed, glass filaments and an aerogel or glass bubbles may be more uniformly mixed while substantially maintaining the properties and the characteristics of the glass filaments and an aerogel or glass bubbles, and a finally prepared polyolefin resin composition may have high mechanical properties and heat resistance even in a low specific gravity range and uniform properties, and completed the invention.

For mixing of the first resin chip and the second resin chip, commonly known methods for mixing or blending polymer resin chips may be used.

The first resin chip may include 40 to 98 wt % of the first polyolefin resin, and 2 to 60 wt % of the glass filaments.

Although the kind or size of the glass filament is not specifically limited as long as it is known to be used while being impregnated in a polymer resin, for easier impregnation in a polyolefin resin and compatibility with the aerogel or glass bubbles, glass filaments having a length of 5 mm to 15 mm and a cross-sectional diameter of 1 to 50 μm may be used.

The second resin chip may include 40 to 98 wt % of the second polyolefin resin, and 2 to 60 wt % of the aerogel or glass bubbles.

As the aerogel, commonly known or commercially available products may be used without specific limitations, and for example, an aerogel having a longest diameter of 1 to 50 μm may be used. Further, the aerogel may have a specific surface area of 100 $cm^3/g$ to 1,000 $cm^3/g$.

The glass bubble may be a hollow spherical glass particle having a longest diameter of 5 μm to 100 μm. The glass bubble may have a specific gravity of 0.10 g/cc to 0.70 g/cc. As the glass bubble, commonly known or commercially available products may be used without specific limitations, and for example, products from 3M Company may be used.

The first polyolefin resin and the second polyolefin resin may respectively include isotactic polypropylene having a melt index (measured at 230° C. according to ASTM D-1238) of 10 g/10 min to 40 g/10 min. If such isotactic polypropylene is used, contrary to the case wherein common polypropylene resin is used, the prepared polyolefin resin may have excellent properties such as high flowability and formability, and high mechanical properties and the like, and may secure high compatibility with other components.

Meanwhile, it is preferable that a difference between the lengths of the first resin chip and the second resin chip to be mixed is not so large, so that glass fibers and an aerogel or glass bubbles may be more uniformly distributed in the finally prepared polyolefin resin. For example, the ratio of the length of the second resin chip to the length of the first resin chip may be 0.8 to 1.2, or 0.9 to 1.1.

The lengths of the first resin chip and the second resin chip are not specifically limited, and may be appropriately controlled considering the properties of the finally prepared polyolefin resin composition, and the like. For example, the first resin chip and the second resin chip may respectively have a length of 3 mm to 18 mm, or 4 mm to 15 mm.

The first resin chip and the second resin chip may respectively further include other additives, for example, inorganic fillers, emulsifiers, antioxidants, and the like.

The second resin chip may further include a coloring agent. As a coloring agent is included in the second resin chip, excellent coloring performance may be exhibited when a molded article is manufactured, and an excellent molded article may be prepared without degradation of properties.

The method for preparing a polyolefin resin composition according to one embodiment may further include a step of preparing the second resin chip including injecting an aerogel or glass bubbles inside an extruder into which the second polyolefin resin is injected through a side feeder connected to the extruder.

By progressing extrusion while injecting the second polyolefin resin inside an extruder and injecting an aerogel or glass bubbles through a side feeder connected to the extruder, the aerogel or glass bubbles may be uniformly dispersed in the second polyolefin resin without a substantial change in the shape or properties of the aerogel or glass bubbles. By using the above-prepared second resin chip in the method for preparing a polyolefin resin composition of one embodiment, glass filaments and an aerogel or glass bubbles may be more uniformly mixed while substantially maintaining the properties and the characteristics of the glass filaments and aerogel or glass bubbles in the finally prepared resin composition.

The step of preparing the second resin chip may be conducted at a temperature of 200° C. to 280° C. If the temperature of the step of preparing the second resin chip is too low, melting of the second polyolefin resin may not be easy. If the temperature of the step of preparing the second resin chip is too high, in the step of preparing the second resin chip, the shape of the aerogel or glass bubbles may be changed or destroyed, rendering the mixing and dispersion of the second polyolefin resin and aerogel or glass bubbles insufficient, and thus the specific gravity of the finally prepared resin composition may become high or the mechanical properties may not be sufficient.

A speed at which the second polyolefin resin is injected inside an extruder may be 80 RPM to 580 RPM. The speed at which the second polyolefin resin is injected inside an extruder means a rotation speed of a feeder that injects the second polyolefin resin or equipment included therein such as a screw and the like. If the speed at which the second polyolefin resin is injected is too high, flowability of the prepared polyolefin resin may be lowered, thus degrading processibility such as generating problems in the preparation of a resin molded article. Further, if the speed at which the second polyolefin resin is injected is too low, the content of filament reinforcement may not be sufficient, thus degrading mechanical properties of the final product.

A speed at which an aerogel or glass bubbles are injected through the side feeder may be 80 RPM to 580 RPM. The speed at which an aerogel or glass bubbles are injected through the side feeder means a rotation speed of a side feeder that injects the aerogel or equipment included therein such as a screw and the like.

If the speed at which the aerogel or glass bubbles are injected through the side feeder is too high, mixing with the second polyolefin resin may not be easy, and the aerogel or glass bubbles may be aggregated in the finally prepared polyolefin resin composition, thus degrading the mechanical properties of the polyolefin resin composition. If the speed at which the aerogel or glass bubbles are injected through the side feeder is too low, it may be difficult for the polyolefin resin composition to secure sufficient mechanical properties, or it may be difficult to sufficiently lower the specific gravity.

The kind of shape of the extruder is not specifically limited, and extruders commonly known to be used for extrusion of a polymer resin, for example, a single screw extruder or a twin screw extruder, and the like, may be used.

The screw included in the extruder may rotate at a speed of 250 to 400 RPM. If the rotation speed of the screw of the extruder is too high, the shape of the aerogel or glass bubbles may be changed or destroyed, thus degrading the properties of the final product. If the rotation speed of the screw of the extruder is too low, the second polyolefin and the aerogel may not be uniformly mixed.

According to another embodiment of the invention, provided is a polyolefin resin composition including a mixture of a first resin chip including a first polyolefin resin and glass filaments impregnated in the first polyolefin resin, and a second resin chip including a second polyolefin resin and an aerogel or glass bubbles impregnated in the second polyolefin resin, wherein micropores having a diameter of 1 to 50 μm are distributed in the second resin chip, and the polyolefin resin composition has a specific gravity of 0.75 to 1.00.

As explained above, if glass filaments and the aerogel or glass bubbles are respectively impregnated in a polyolefin resin, for example, prepared in a polymer resin chip, and mixed, the glass filaments and aerogel or glass bubbles may be more uniformly mixed while substantially maintaining the properties and the characteristics of the glass filament and aerogel or glass bubbles, and the finally prepared polyolefin resin composition may have high mechanical properties and heat resistance even in a low specific gravity range and uniform properties.

Specifically, the polyolefin resin composition may include a mixture or blended product of the first resin chip and the second resin chip. Namely, the polyolefin resin composition may include a polymer resin composite wherein a first resin chip including a first polyolefin resin and glass filaments impregnated in the first polyolefin resin, and a second resin chip including a second polyolefin resin and an aerogel or glass bubbles impregnated in the second polyolefin resin, are extruded and mixed.

Since the first resin chip and the second resin chip are respectively divided and mixed in the process of preparing the polyolefin resin composition, change or destruction of the shape of aerogel or glass bubbles included inside may be minimized. Thereby, in the second resin chip included in the polyolefin resin composition, micropores having a diameter of 1 to 50 μm may be distributed. The micropores having a diameter of 1 to 50 μm may be micropores formed in the second resin chip due to the aerogel or glass bubbles.

As the polyolefin resin composition includes the aerogel or glass bubbles in the second resin chip, the specific gravity may be relatively lowered, and particularly, it may have a specific gravity of 0.75 to 1.05, or 0.80 to 1.00.

Further, as the polyolefin resin composition includes glass filaments and the aerogel or glass bubbles in the first and second polyolefin resins, it may have high mechanical properties and heat resistance and the like, even in the above-explained specific gravity range.

Specifically, the polyolefin resin composition or a resin molded article formed therefrom may have a tensile strength of 90 MPa or more, or 90 MPa to 150 MPa. The polyolefin resin composition or a resin molded article formed therefrom may have a flexural modulus of 4,000 MPa or more, or 4,000 MPa to 6,000 MPa. The polyolefin resin composition or a resin molded article formed therefrom may have a heat deflection temperature according to ASTM D648 of 135° C., or 135° C. to 170° C., or 145° C. to 160° C.

The polyolefin resin composition may include 40 to 98 wt % of a polyolefin resin, 1 to 30 wt % of glass filaments, and 1 to 30 wt % of an aerogel or glass bubbles.

The first resin chip may include 40 to 98 wt % of the first polyolefin resin, and 2 to 60 wt % of the glass filaments. The second resin chip may include 40 to 98 wt % of the second polyolefin resin, and 2 to 60 wt % of the aerogel or glass bubbles.

The first polyolefin resin and the second polyolefin resin may respectively include isotactic polypropylene having a melt index (measured at 230° C. according to ASTM D-1238) of 10 g/10 min to 40 g/10 min. If such isotactic polypropylene is used, contrary to the case wherein common polypropylene resin is used, the prepared polyolefin resin may have excellent properties such as high flowability and formability, and high mechanical properties and the like, and may secure high compatibility with other components.

Meanwhile, it is preferable that a difference between the lengths of the first resin chip and the second resin chip to be mixed is not so large, so that glass fibers and aerogel or glass bubbles may be more uniformly distributed in the finally prepared polyolefin resin. For example, the ratio of the length of the second resin chip to the length of the first resin chip may be 0.8 to 1.2, or 0.9 to 1.1.

The lengths of the first resin chip and the second resin chip are not specifically limited, and may be appropriately controlled considering the properties of the finally prepared polyolefin resin composition, and the like. For example, the first resin chip and the second resin chip may respectively have a length of 3 mm to 18 mm, or 4 mm to 15 mm.

The first resin chip and the second resin chip may respectively further include other additives, for example, inorganic fillers, emulsifiers, antioxidants, and the like.

According to yet another embodiment of the invention, provided is a polyolefin resin molded article including an extrusion molded article of the polyolefin resin composition according to the above-explained embodiment, and having a specific gravity of 0.75 to 1.05.

As explained above, if glass filaments and an aerogel are respectively impregnated in a polyolefin resin, for example, two kinds of polymer resin chips are prepared, and mixed, the glass filaments and aerogel or glass bubbles may be more uniformly mixed while substantially maintaining the properties and the characteristics of the glass filament and aerogel or glass bubbles, and the finally prepared polyolefin resin composition may have high mechanical properties and heat resistance even in a low specific gravity range and uniform properties.

Specifically, the polyolefin resin composition may include a mixture or blended product of the first resin chip and the second resin chip. Namely, the polyolefin resin composition may include a polymer resin composite wherein a first resin chip including a first polyolefin resin and glass filaments impregnated in the first polyolefin resin, and a second resin chip including a second polyolefin resin and an aerogel or glass bubbles impregnated in the second polyolefin resin, are extruded and mixed.

For mixing the first resin chip and the second resin chip, commonly known methods for mixing polymer resin chips may be used.

As the polyolefin resin composition includes an aerogel or glass bubbles in the second resin chip, the specific gravity may be relatively lowered, and particularly, it may have a specific gravity of 0.75 to 1.05, or 0.80 to 1.00. Further, as the polyolefin resin composition includes the glass filaments and aerogel in the first and second polyolefin resins, it may have high mechanical properties and heat resistance even in the above-explained specific gravity range.

Advantageous Effects of the Invention

According to the present invention, provided is a method for preparing a polyolefin resin composition that can substantially maintain the properties and the characteristics of the components and yet more uniformly mix them, and can provide a polyolefin resin composition having high mechanical properties and heat resistance even in a low specific gravity range and uniform properties, and a polyolefin resin composition that can secure high mechanical properties and heat resistance even at a low specific gravity area and has uniform properties over an entire area thereof.

BRIEF DESCRIPTION OF THE DRAWINGS

FIG. 1 shows a photograph of a fracture plane of a second resin chip containing glass bubbles prepared in Example 1, taken with a scanning electron microscope.

DETAILED DESCRIPTION OF THE EMBODIMENT

Hereinafter, the present invention will be explained in detail with reference to the following examples. However, these examples are only to illustrate the invention, and the scope of the invention is not limited thereto.

Examples and Comparative Example: Preparation of Polyolefin Resin Composition

Example 1

(1) Preparation of a First Resin Chip Including a First Polyolefin Resin and Glass Filaments Impregnated in the First Polyolefin Resin Glass filaments (length of 7 mm, cross-sectional diameter of 20 μm) were impregnated in isotactic polypropylene having a melt index of 30 g/10 min (measured at 230° C. according to ASTM D-1238) at 240° C. using a twin screw extruder (screw diameter 40 mm) and an impregnation die, to prepare a first resin chip with a length of about 1 mm (glass filament content of 20 wt %).

(2) Preparation of Second Resin Chip Including Second Polyolefin Resin and Aerogel Impregnated in the Second Polyolefin Resin While isotactic polypropylene having a melt index of 30 g/10 min (measured at 230° C. according to ASTM D-1238) was injected into a twin screw extruder (screw diameter 40 mm, rotation speed about 300 RPM) at a speed of about 460 RPM to 530 RPM, and glass bubbles (longest diameter of about 20 μm, 3M Company product) were injected at a rate of 16 to 18 Hz through a side feeder installed in the twin screw extruder, pelletizing was conducted at 240° C. to prepare a second resin chip with a length of about 11 mm (aerogel contents about 10 wt %).

(3) Mixing and Injection Molding of the First and Second Resin Chips

The first resin chip and the second resin chip were mixed at a weight ratio of 1:1 to prepare a polymer resin blend composition. The polymer resin blend composition was injected using an electric injection machine equipped with a screw only for filaments at 190 to 230° C. at an injection time of 8 to 10 s, to prepare an injection molded specimen.

Example 2

A first resin chip, a second resin chip, a polymer resin blend composition, and an injection molded specimen were prepared by the same method as Example 1, except that the content of glass bubbles included in the second resin chip was changed to about 20 wt %.

Example 3

A first resin chip, a second resin chip, a polymer resin blend composition, and an injection molded specimen were prepared by the same method as Example 1, except that porous silica aerogel (specific surface area about 500 cm$^3$/g) was used instead of the glass bubbles included in the second resin chip.

Comparative Example

At 240° C., using a twin screw extruder (screw diameter 40 mm) and an impregnation die, glass bubbles were introduced into isotactic polypropylene having a melt index of 30 g/10 min (measured at 230° C. according to ASTM D-1238) and extrusion was conducted, glass filaments (length of 7 mm, cross-sectional diameter of 20 μm) were impregnated therein, followed by pelletizing to prepare a polymer resin chip (glass fiber content: about 10 wt %, aerogel content about 5 wt %).

Experimental Examples: Measurement of Properties of Polyolefin Resin Composition Experimental Example 1: Measurement of Specific Gravity Specific gravities of the extrusion molded specimen of the polymer resin blend composition obtained in the examples and the resin chip of the comparative example were measured using MD-300S equipment (MIRAGE Company, Japan) according to the standard of ASTM D 792.

Experimental Example 2: Tensile Strength

Tensile strengths of the extrusion molded specimen of the polymer resin blend composition obtained in the examples and the resin chip of the comparative example were measured using a universal testing machine according to the standard of ASTM D638.

Experimental Example 3: Flexural Modulus

Flexural modulus of the extrusion molded specimen of the polymer resin blend composition obtained in the examples and the resin chip of the comparative example were measured using a universal testing machine according to the standard of ASTM D790.

Experimental Example 4: Heat Deflection Temperature

Heat deflection temperatures of the extrusion molded specimen of the polymer resin blend composition obtained in the examples and the resin chip of the comparative example were measured according to the standard of ASTM D648.

The results of Experimental Examples 1 to 4 are described in the following Table 1.

TABLE 1

The results of Experimental Examples

| | Specific gravity | Tensile strength (MPa) | Flexural modulus (MPa) | Heat deflection temperature (° C.) |
|---|---|---|---|---|
| Example 1 | 0.99 | 101 | 5,020 | 153 |
| Example 2 | 0.97 | 90 | 4880 | 152 |
| Comparative Example 1 | 1.00 | 82 | 4,498 | 153 |

As shown in Table 1, in the examples, the components may be more uniformly mixed while substantially maintaining the properties and the characteristics of the components, and a polyolefin resin composition having high mechanical properties and heat resistance even in a low specific gravity range and uniform properties and a resin molded article using the same may be provided.

Experimental Example 5. Observation of Inside of Resin

In FIG. 1, the photograph of the fracture plane of the second resin chip containing glass bubbles prepared in Example 1, taken with a scanning electron microscope, is shown. As shown in FIG. 1, it is confirmed that in the polypropylene resin base of the second resin chip, micropores having a diameter of 1 to 50 µm are uniformly dispersed.

The invention claimed is:

1. A method for preparing a polyolefin resin composition comprising the steps of:
mixing a first resin chip comprising a first polyolefin resin and glass filaments impregnated in the first polyolefin resin; and a second resin chip comprising a second polyolefin resin and an aerogel or glass bubbles impregnated in the second polyolefin resin,
wherein a ratio of a length of the second resin chip to a length of the first resin chip is 0.8 to 1.2.

2. The method according to claim 1,
wherein the first resin chip comprises 40 to 98 wt % of the first polyolefin resin and 2 to 60 wt % of the glass filaments, and
the second resin chip comprises 40 to 98 wt % of the second polyolefin resin and 2 to 60 wt % of the aerogel or glass bubbles.

3. The method according to claim 1,
wherein the first polyolefin resin and the second polyolefin resin respectively comprise isotactic polypropylene having a melt index (measured at 230° C. according to ASTM 3-1238) of 10 g/10 min to 40 g/10 min.

4. The method according to claim 1,
wherein the glass filament has a length of 5 mm to 15 mm and a cross-sectional diameter of 1 to 50 µm.

5. The method according to claim 1,
wherein the aerogel has a longest diameter of 1 to 50 µm.

6. The method according to claim 1,
wherein the aerogel has a specific surface area of 100 cm$^3$/g to 1,000 cm$^3$/g.

7. The method according to claim 1,
wherein the glass bubble is a hollow spherical glass particle having a longest diameter of 5 µm to 100 µm.

8. The method according to claim 1,
wherein the glass bubble has a specific gravity of 0.10 g/cc to 0.70 g/cc.

9. The method according to claim 1,
wherein the second resin chip further comprises a coloring agent.

10. The method according to claim 1,
further comprising the step of preparing the second resin chip comprising injecting an aerogel or glass bubbles inside an extruder into which the second polyolefin resin is injected through a side feeder connected to the extruder.

11. The method according to claim 10,
wherein the step of preparing the second resin chip is conducted at a temperature of 200° C. to 280° C.

12. The method according to claim 10,
wherein the speed at which the second polyolefin resin is injected inside the extruder is 80 RPM to 580 RPM.

13. The method according to claim 10,
wherein the speed at which the aerogel or glass bubbles are injected through the side feeder is 80 RPM to 580 RPM.

14. The method according to claim 10,
wherein a screw of the extruder rotates at a speed of 250 to 400 RPM.

15. A polyolefin resin composition comprising: a mixture of a first resin chip comprising a first polyolefin resin and glass filaments impregnated in the first polyolefin resin; and a second resin chip comprising a second polyolefin resin and an aerogel or glass bubbles impregnated in the second polyolefin resin,
wherein micropores having a diameter of 1 to 50 µm are distributed in the second resin chip, and
the polyolefin resin composition has a specific gravity of 0.75 to 1.00.

16. The polyolefin resin composition according to claim 15,
wherein the composition has a specific gravity of 0.80 or more and less than 1.00 and a heat deflection temperature according to ASTM D648 of 152° C. or more.

17. The polyolefin resin composition according to claim 15,
wherein the first resin chip comprises 40 to 98 wt % of the first polyolefin resin and 2 to 60 wt % of the glass filaments, and
the second resin chip comprises 40 to 98 wt % of the second polyolefin resin and 2 to 60 wt % of the aerogel or glass bubbles.

18. The polyolefin resin composition according to claim 15,
wherein the first polyolefin resin and the second polyolefin resin respectively comprise isotactic polypropylene having a melt index (measured at 230° C. according to ASTM 3-1238) of 10 g/10 min to 40 g/10 min.

19. The polyolefin resin composition according to claim 15,
wherein the ratio of the length of the second resin chip to the length of the first resin chip is 0.8 to 1.2.

20. A polyolefin resin molded article comprising an extrusion molded article of the polyolefin resin composition of claim 15, and having a specific gravity of 0.75 to 1.05.

* * * * *